(12) United States Patent
Koyama

(10) Patent No.: US 11,003,967 B2
(45) Date of Patent: May 11, 2021

(54) INFORMATION PROCESSING SYSTEM, INFORMATION PROCESSING APPARATUS, AND NON-TRANSITORY COMPUTER READABLE MEDIUM FOR EXECUTING PRINTING USING STORED INFORMATION

(71) Applicant: FUJI XEROX CO., LTD., Tokyo (JP)

(72) Inventor: Yuichiro Koyama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/545,048

(22) Filed: Aug. 20, 2019

(65) Prior Publication Data
US 2020/0311498 A1 Oct. 1, 2020

(30) Foreign Application Priority Data
Mar. 25, 2019 (JP) .............................. JP2019-056028

(51) Int. Cl.
*G06K 15/02* (2006.01)
(52) U.S. Cl.
CPC ..... *G06K 15/1886* (2013.01); *G06K 15/1813* (2013.01); *G06K 15/1819* (2013.01); *G06K 15/1857* (2013.01)

(58) Field of Classification Search
CPC .......... G06K 15/1886; G06K 15/1857; G06K 15/1813; G06K 15/1819; G06F 3/1248
See application file for complete search history.

(56) References Cited

U.S. PATENT DOCUMENTS

| 2016/0086063 A1* | 3/2016 | Horii | G06K 15/1822 358/1.15 |
| 2017/0249538 A1* | 8/2017 | Nakayama | G06K 15/1813 |
| 2018/0053075 A1* | 2/2018 | Kubo | G06K 15/1857 |

FOREIGN PATENT DOCUMENTS

JP H10-198531 A 7/1998

* cited by examiner

*Primary Examiner* — Juan M Guillermety
(74) *Attorney, Agent, or Firm* — Oliff PLC

(57) ABSTRACT

An information processing system includes: a storage unit that stores first printing information on already executed printing in association with an image for printing converted from the first printing information; and an execution unit that, when second printing information included in a printing instruction which instructs execution of printing is identical to the first printing information stored in the storage unit, executes printing according to the printing instruction using the image for printing.

8 Claims, 4 Drawing Sheets

FIG. 3

| USER INFORMATION | | | FILE NAME | OUTPUT TIME | PRINT JOB | | | |
|---|---|---|---|---|---|---|---|---|
| USER NAME | USER ID | GROUP | | | AUTHENTICATION INFORMATION | CONTROL INFORMATION | PDL | RASTER IMAGE |
| AAA | aaa0000 | DIVISION | xxxxxxxx | 20190220 1110 | △△△△△△ | ... | (BINARY) | (BINARY) |
| BBB | bbb1111 | TEAM | yyyyyyyy | 20190221 1456 | □□□□□□ | ... | (BINARY) | (BINARY) |
| ... | ... | ... | ... | ... | ... | ... | ... | ... |

215

INFORMATION PROCESSING SYSTEM, INFORMATION PROCESSING APPARATUS, AND NON-TRANSITORY COMPUTER READABLE MEDIUM FOR EXECUTING PRINTING USING STORED INFORMATION

CROSS-REFERENCE TO RELATED APPLICATIONS

This application is based on and claims priority under 35 USC 119 from Japanese Patent Application No. 2019-056028 filed Mar. 25, 2019.

BACKGROUND

(i) Technical Field

The present disclosure relates to an information processing system, an information processing apparatus, and a non-transitory computer readable medium.

(ii) Related Art

A network printer has been proposed that is capable of reprinting a document without changing or newly developing application software on the client side (see, for instance, Japanese Unexamined Patent Application Publication No. 10-198531).

The network printer described in Japanese Unexamined Patent Application Publication No. 10-198531 includes a document reception unit that is connected to a network and receives a document sent from a client; an image transform unit that transforms the received document into printable image data; a printing unit that prints the transformed image data; an image data memory unit that stores the transformed image data; and a data comparison unit that determines identicalness between the document received by the reception unit and the image data stored in the image data memory unit, and when the identicalness is determined, sends the image data to the printing unit.

SUMMARY

When an object once printed is reprinted, the time taken for the reprinting is reduced by utilizing an image for printing used when the printing was performed in the past.

Aspects of non-limiting embodiments of the present disclosure relate to providing an information processing system, an information processing apparatus, and a non-transitory computer readable medium storing a program that, when the same object is printed even with a different name, are capable of utilizing an image for printing the object used in the past.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including: a storage unit that stores first printing information on already executed printing in association with an image for printing converted from the first printing information; and an execution unit that, when second printing information included in a printing instruction which instructs execution of printing is identical to the first printing information stored in the storage unit, executes printing according to the printing instruction using the image for printing.

BRIEF DESCRIPTION OF THE DRAWINGS

Exemplary embodiment of the present disclosure will be described in detail based on the following figures, wherein:

FIG. 3 is a table illustrating an example of execution history information; and

DETAILED DESCRIPTION

Figure 1:
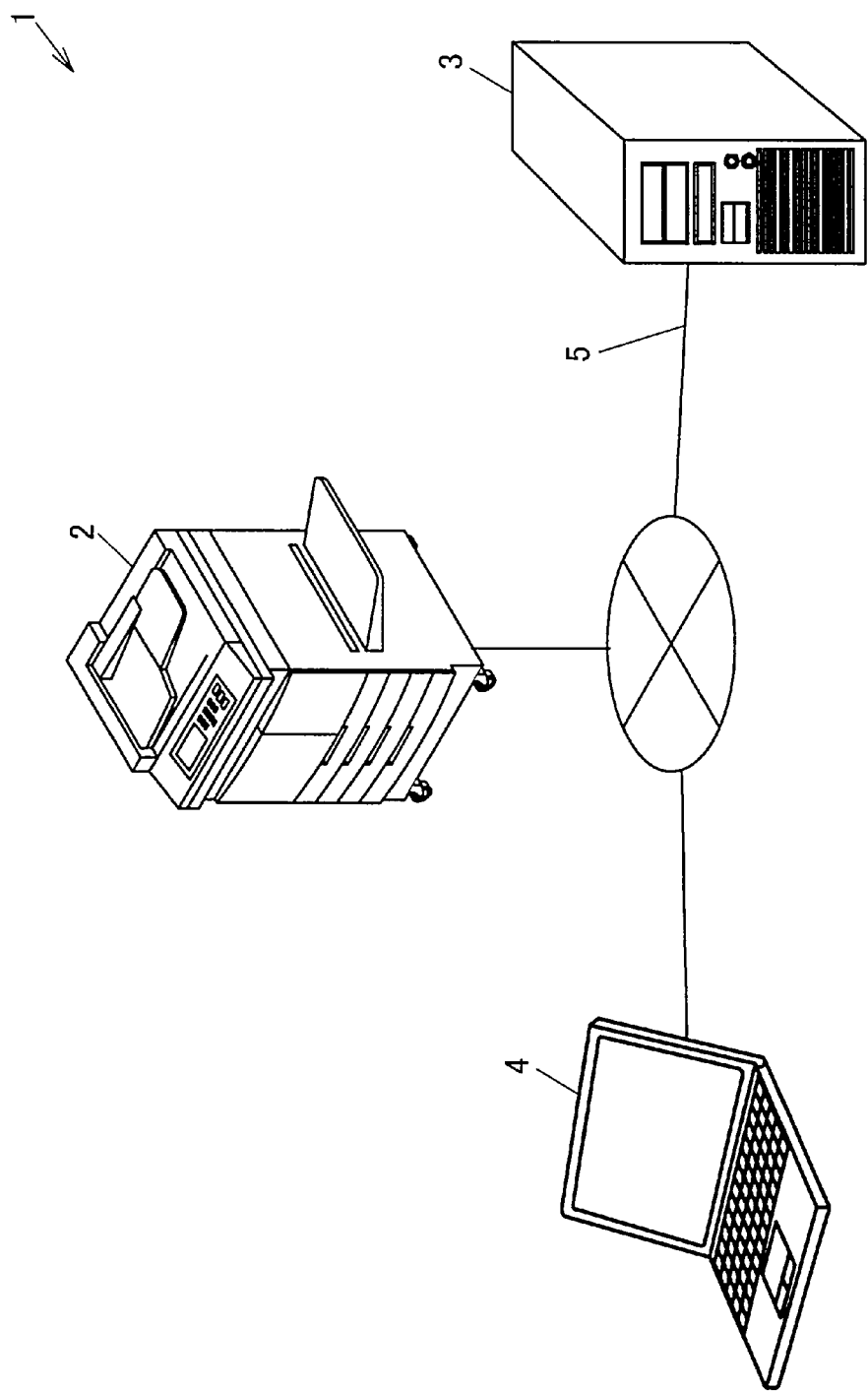
FIG. 1 is an illustration showing an example of the configuration of an image forming system according to an exemplary embodiment of the present disclosure.

Hereinafter, an exemplary embodiment of the present disclosure will be described with reference to the drawings. It is to be noted that components having substantially the same function in the drawings are labeled with the same symbol, and a redundant description thereof will be omitted. Although an example of an image forming system will be described as an information processing system, the information processing system is not limited to the image forming system. Although an example of an image forming apparatus will be described as an information processing apparatus, the information processing apparatus is not limited to the image forming apparatus.

Exemplary Embodiment

FIG. 1 is an illustration showing an example of the configuration of an image forming system according to an exemplary embodiment of the present disclosure. An image forming system 1 is configured by an image forming apparatus 2, a server apparatus 3, and a terminal apparatus 4. The image forming apparatus 2, the server apparatus 3, and the terminal apparatus 4 are coupled to each other via a network 5.

The image forming system 1 is an example of an information processing system. The image forming apparatus 2 is an example of an information processing apparatus. It is to be noted that although an example of the image forming system 1 including one image forming apparatus 2, one server apparatus 3, and one terminal apparatus 4 is illustrated, the number of apparatuses is not limited to one.

The image forming apparatus 2 is a multifunctional apparatus having multiple functions such as a scanning function, a printing function, a copying function, a facsimile function, and an electronic mail function. The image forming apparatus 2 is not limited to a multifunctional apparatus.

The server apparatus 3 corresponds to, for instance, a digital front end (DFE) apparatus or a cloud server apparatus. As the terminal apparatus 4, a mobile information terminal, such as a personal computer, a tablet terminal, or a multifunctional mobile phone (smartphone), may be used. The network 5 is, for instance, a local area network (LAN), an internet, or an intranet, and may be a wired network or a wireless network.

(Configuration of Image Forming Apparatus 2)

Figure 2:
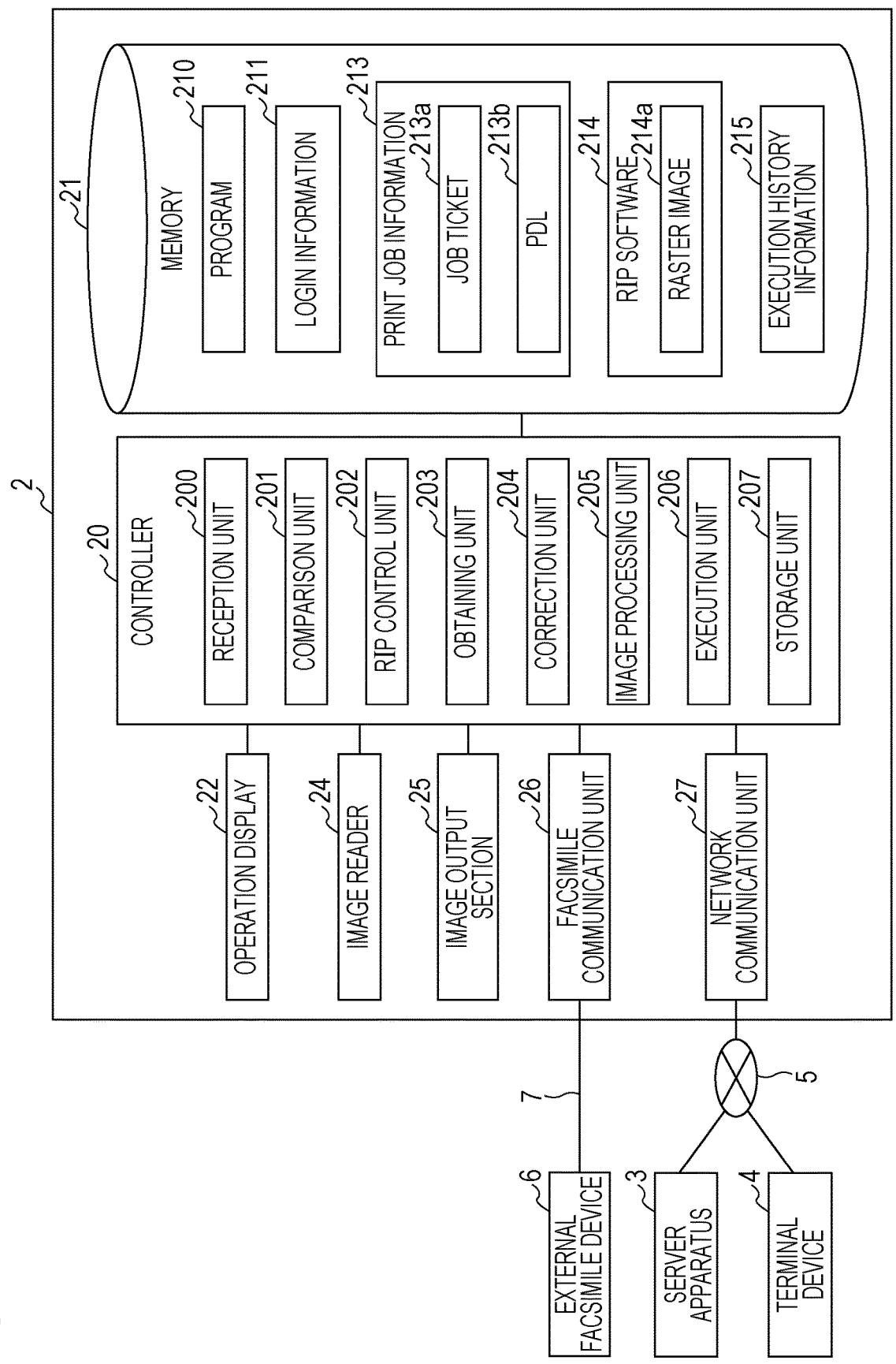
FIG. 2 is a block diagram illustrating an example of a control system of the image forming apparatus illustrated in FIG. 1.

FIG. 2 is a block diagram illustrating an example of a control system of the image forming apparatus 2. The image forming apparatus 2 includes a controller 20 that controls the units, a memory 21 that stores various types of data, an operation display 22 that receives input of information and displays information, an image reader 24 that reads a document image from a document, an image output section 25 that outputs an image by printing, a facsimile communication unit 26 that transmits and receives facsimile data to and from an external facsimile device 6 via a public line network 7, a network communication unit 27 that communicates with the server apparatus 3 and the terminal apparatus 4 via the network 5. The memory 21 is an example of a storage unit.

(Controller 20)

The controller 20 is configured by a central processing unit (CPU), an interface, and others. The CPU operates in accordance with a program 210 stored in the memory 21, thereby serving as a reception unit 200, a comparison unit 201, a RIP control unit 202, an obtaining unit 203, a correction unit 204, an image processing unit 205, an execution unit 206, and others. The comparison unit 201 is an example of a narrowing-down unit. The details of the units 200 to 206 will be described later.

(Memory 21)

The memory 21 includes a read only memory (ROM), a random access memory (RAM), and a hard disk, and stores various type of data such as login information 211 (see FIG. 2), print job information 213, and execution history information 215.

(1) Login Information 211

In the login information 211, information for authenticating a user when an operator (hereinafter also referred to as a "user") logins the image forming apparatus 2 is registered. The login information includes, for instance, identification information (hereinafter also referred to as a "user ID") that identifies a user, the name of a user (hereinafter also referred to as a "username"), and a password.

(2) Print Job Information 213

The print job information 213 is information in which a printing instruction (hereinafter also referred to as a "print job" or a simply "job") which instructs execution of printing and identification information (hereinafter also referred to as a "job ID") which identifies the print job are recorded in association with each other.

The print job includes a job ticket 213a which records an attribute of a job, and data (hereinafter also simply referred to as "print data" or "PDL") 213b described by a page description language (PDL) which can be interpreted by the image forming apparatus 2. The PDL 213b is an example of printing information.

The job ticket 213a includes, for instance, the following information.

(a) attribute of an object to be printed.
  name of an object to be printed (for instance, a filename, or a document name)
  authenticating information such as a username
(b) conditions for printing (hereinafter also referred to as "printing options").
  double-sided/single-sided
  number of copies
  color mode
  imposition (also referred to as "N-up")
  direction of printing (for instance, portrait or landscape)
  size of sheet
  setting of pages (such as a binding margin, a print position, and a margin)

(c) conditions for postprocessing (hereinafter also referred to as "postprocessing options").
  needle clamp (hereinafter also referred to as "stapling").
  hole cutting (hereinafter also referred to as "punching").

The PDL 213b includes multiple types which are outputted in different formats, such as Portable Document Format (PDF), PostScript (registered trademark), and Printer Command Language (PCL).

(3) RIP Software 214

The RIP software 214 is software that generates an image 214a for printing (hereinafter also referred to as a "print image" or "raster image") in a bitmap format according to a print job, the image 214a being constituted by a set of points, each of which is one dot (pixel) unit.

Specifically, the RIP software 214 converts the PDL 213b included in a print job into a raster image 214a. The RIP software 214 corresponding to the above-described type of the PDL 213b is used. Hereinafter converting the PDL 213b into the raster image 214a is also referred to as "raster rising" or "decomposing".

The raster image 214a is generated in a format such as Joint Photographic Experts Group (JPEG), Tag Image File Format (TIFF), Graphics Interchange Format (GIF), and Portable Network Graphics (PNG). The raster image 214a is an example of a drawing result after being decomposed.

A period of time (hereinafter also referred to as a "storage time") during which the raster image 214a is stored in the memory 21 may be adjusted as appropriate according to the attribute of the raster image 214a. The period of time during which the raster image 214a is stored in the memory 21 may be adjusted according to the volume of the data of the raster image 214a, for instance. Specifically, when compression processing is performed on the raster image 214a (in other words, when the volume of the data is less than or equal to a certain value), the raster image 214a may be stored for a period of time longer than the period of time when the processing is not performed (in other words, when the volume of the data is greater than a certain value).

As an example, when the storage time of the raster image 214a compressed is N days since execution of printing (N is a natural number, for instance, three), the storage time of the raster image 214a uncompressed (hereinafter also referred to as "raw data") may be (N−K) days since execution of printing (K is a natural number smaller than N, for instance, two).

(4) Execution History Information 215

FIG. 3 is a table illustrating an example of the execution history information 215. The execution history information 215 is an information table which records a history of printing executed in the past. The execution history information 215 records user information indicating a user (for instance, a user who has transmitted a print job from the terminal apparatus 4, and a user who has instructed execution of printing by an operation of the image forming apparatus 2) who has instructed execution of printing; a print job related to already executed printing; and the raster image 214a corresponding to the PDL 213b included in the relevant print job, in association with each other. The print jobs recorded in the execution history information 215 are each an example of a first printing instruction.

Specifically, as illustrated in FIG. 3, the execution history information 215 records, for instance, a username, a user ID, the name of a group to which the user belongs, the name (for instance, a file name) of an object to be printed, the time of execution of a job (hereinafter also simply referred to as an "output time", the output time may be, for instance, the time when printing is completed), print job information indicating a print job including authentication information, control information, and the PDL 213b (in other words, the PDL 213b of already executed printing), and the raster image 214a corresponding to the PDL 213b, in association with each other. Here, the group refers to a group of people, to which the user belongs. The group is, for instance, a company, organized groups (such as a department, a section, a division, and a liaison) belonging to a company, and a body of persons.

(Operation Display 22)

The operation display 22 is, for instance, a touch panel display, and has a configuration in which a touch panel is disposed on a display such as a liquid display in an overlapped manner.

(Image Reader 24)

The image reader 24 reads an image from a document, and includes an automatic document feeder (not illustrated) provided on a platen (not illustrated), and a scanner (not illustrated). The image reader 14 optically reads an image from a document placed on the platen or a document fed by the automatic document feeder.

(Image Output Section 25)

The image output section 25 outputs a color image or a monochrome image to a recording medium such as a sheet of paper by the electrophotographic system or the inkjet system, for instance.

(Facsimile Communication Unit 26)

The facsimile communication unit 26 modulates or demodulates data in accordance with a facsimile protocol such as G3, G4, and performs facsimile communication via the public line network 7.

(Network Communication Unit 27)

The network communication unit 27 is implemented by a network interface card (NIC), Wi-Fi, or BlueTooth (registered trademark), and transmits and receives a signal to and from the server apparatus 3 and the terminal apparatus 4 via the network 5.

[Units 200 to 206]

Next, the details of the units 200 to 206 included in the controller 20 will be described. The reception unit 200 receives a print job transmitted from the terminal apparatus 4. The print job transmitted from the terminal apparatus 4 is an example of a second printing instruction.

The comparison unit 201 compares the PDL 213b included in the received print job (hereinafter also referred to as the "relevant PDL 213b") with the PDL 213b recorded (hereinafter also referred to as "already stored") in the execution history information 215 of the memory 21. The relevant PDL 213b is an example of second printing information. The already stored the PDL 213b is an example of first printing information.

In other words, the comparison unit 201 compares the portion of the PDL 213b (hereinafter also simply referred to as the "PDL 213b portion") related to drawing of the received print job with the PDL 213b portion related to drawing of the already stored print job. In addition, the comparison unit 201 outputs result information indicating a result of comparison as to whether the relevant PDL 213b is identical to the already stored PDL 213b. It is to be noted that "identical" includes completely identical, that is, a state with no slight difference.

The comparison unit 201 does not necessarily compare the relevant PDL 213b with all of the already stored PDLs 213b. Particularly, when multiple PDLs 213b are stored in the memory 21, for instance, the comparison unit 201 may narrow down the already stored PDLs 213b to object PDLs 213b (hereinafter also referred to as "objects to be searched") to be compared with the relevant PDL 213b, based on a predetermined criterion.

For instance, the comparison unit 201 may narrow down the PDLs 213b beforehand according to attribute information associated with the relevant PDL 213b. Specifically, the comparison unit 201 may narrow down the PDLs 213b beforehand to object PDLs 213b to be searched from a viewpoint such as whether user names are identical, whether group names are identical, whether names of objects to be printed are identical, and the execution time of a job is within a predetermined range. In that case, the comparison unit 201 determines whether the relevant PDL 213b is identical to one of the already stored PDLs 213b which have been narrowed down.

In addition, the comparison unit 201 compares the authentication information and control information included in the print job with the authentication information and control information, respectively included in each print job stored in the memory 21, and determines whether both are identical or different.

The RIP control unit 202 controls the RIP software 214, and generates the raster image 214a. In addition, the RIP control unit 202 stores the generated raster image 214a in the memory 21.

The obtaining unit 203 obtains a raster image 214a from the execution history information 215, the raster image 214a corresponding to a PDL 213b for which a result indicating identicalness to the relevant PDL 213b is outputted by the comparison unit 201. In other words, the obtaining unit 203 obtains a drawing result after being decomposed, already stored in the memory 21. In addition, the obtaining unit 203 obtains the authentication information and the control information associated with the raster image 214a along with the raster image 214a.

The correction unit 204 corrects the authentication information and the control information obtained by the obtaining unit 203. The types of control information as the object to be corrected by the correction unit 204 may be limited to predetermined specific types. In other words, part of the control information may be excluded from the object to be corrected by the correction unit 204. As an example, color mode may be excluded from the object to be corrected by the correction unit 204, and the control information as the object to be corrected by the correction unit 204 may be limited to the printing options or postprocessing options other than the color mode.

The image processing unit 205 performs various types of image processing, such as rotation, enlargement, and reduction, on the raster image 214a. The execution unit 206 controls the image reader 24, the image output section 25, the facsimile communication unit 26, and executes the functions of the image forming apparatus 2, that is, the functions such as a scanning function, a printing function, a copying function, and a facsimile function.

A storage unit 207 stores the PDL 213a and the raster image 214a in the memory 21 in association with the user information. In other words, the storage unit 207 serves as a recording unit that records the PDL 213a and the raster image 214a in the execution history information 215 of the memory 21 in association with the user information.

Operation of Exemplary Embodiment

Figure 4:
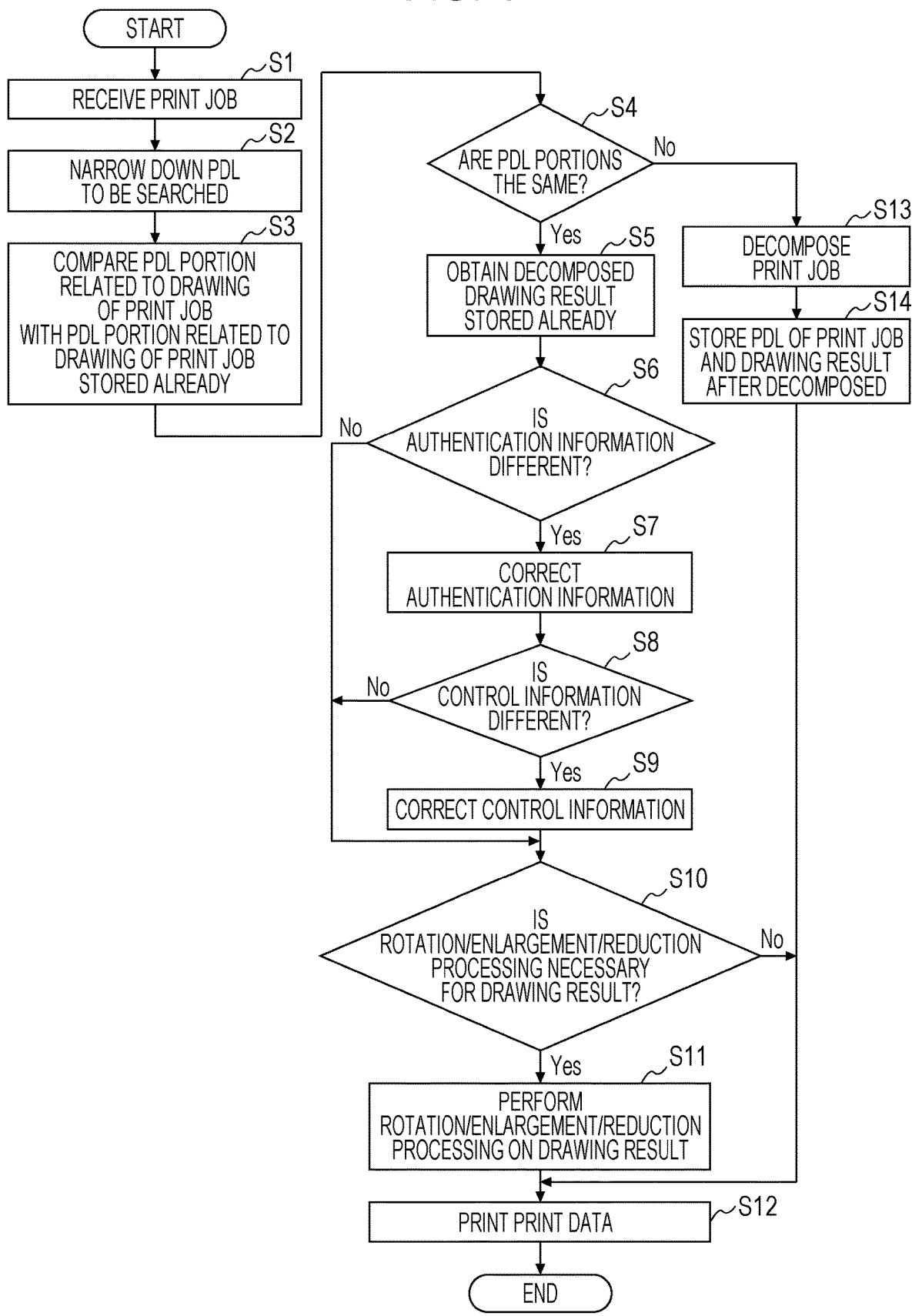
FIG. 4 is a flowchart illustrating an example of an operation of the image forming apparatus illustrated in FIG. 1.

Next, an example of an operation of the image forming apparatus 2 will be described with reference to FIG. 4. FIG. 4 is a flowchart illustrating an example of an operation of the image forming apparatus 2. First, the reception unit 200 receives a print job transmitted from the terminal apparatus 4 (S1).

The comparison unit 201 narrows down the PDLs 213b to be searched (S2). The comparison unit 201 compares the PDL 213b portion related to drawing of the print job with the PDL 213b portion related to drawing of each print job already stored in the memory 21 (S3).

When the PDL 213b portion related to drawing of the print job is identical to the PDL 213b portion related to drawing of a print job already stored in the memory 21 (Yes in S4), the obtaining unit 203 obtains an already stored drawing result after being decomposed (S5). Specifically, the obtaining unit 203 obtain a raster image 214a, authentication information, and control information from the execution history information 215 of the memory 21, the raster image 214a and the information corresponding to a PDL 213b for which a result indicating identicalness to the relevant PDL 213b is outputted.

Next, the comparison unit 201 compares the authentication information included in the print job received by the reception unit 200 with the authentication information obtained by the obtaining unit 203 (S6). When the authentication information included in the print job received by the reception unit 200 is different from the authentication information obtained by the obtaining unit 203 (Yes in S6), the correction unit 204 corrects the authentication information obtained by the obtaining unit 203 to the authentication information included in the print job received by the reception unit 200 (S7).

Similarly to the authentication information, the comparison unit 201 compares the control information included in the print job received by the reception unit 200 with the control information obtained by the obtaining unit 203 (S8). When the control information included in the print job received by the reception unit 200 is different from the control information obtained by the obtaining unit 203 (Yes in S8), the correction unit 204 corrects the control information obtained by the obtaining unit 203 to the control information included in the print job received by the reception unit 200 (S9).

Next, when image processing such as rotation, enlargement, or reduction of a drawing result is necessary (Yes in S10), the image processing unit 205 performs the image processing on the drawing result (S11). "When image processing is necessary" includes when an instruction is issued by a user.

When the PDL 213b portion related to drawing of the print job is not identical to the PDL 213b portion related to drawing of a print job already stored in the memory 21 (No in S4), in short, when both portions are different, the RIP control unit 202 decomposes the print data (S13).

The storage unit 207 stores the PDL 213b of the print job and the drawing result after being decomposed (in other words, the raster image 214a) in the memory 21 (S14). Finally, the execution unit 206 controls the image output section 25, and prints the print data (S12).

Although the exemplary embodiment of the present disclosure has been described above, the exemplary embodiment of the present disclosure is not limited to the above-described exemplary embodiment, and various changes and implementations may be made within a scope not departing from the spirit of the present disclosure. For instance, although the server apparatus 3 is provided separately from the image forming apparatus 2 in the above-described exemplary embodiment, both apparatuses may be integrated.

For instance, in the above-described exemplary embodiment, the starting point of the storage period of the raster image 214a is fixed to the point when initial printing is executed. However, the starting point may be the point when the most recent printing is executed, and each time printing is executed again, the storage period may be reset.

For instance, in the above-described exemplary embodiment, the storage period of the raster image 214a is fixedly determined. However, the storage period may be variably determined according to the frequency of printing of the same object, for instance.

Part or all of the units 200 to 207 of the controller 20 of the image forming apparatus 2 may be provided in the controller (not illustrated) of the server apparatus 3. Various types of data stored in the memory 21 of the image forming apparatus 2 may be stored in the server apparatus 3.

Part or all of the units of the controller 20 may be configured by a hardware circuit such as a field programmable gate array (FPGA), and an application specific integrated circuit (ASIC).

Part of the components of the exemplary embodiment may be omitted or changed within a scope not departing from the spirit of the present disclosure. Addition, deletion, change, and replacement of steps may be made in the flow of the exemplary embodiment within a scope not departing from the spirit of the present disclosure. The program used in the exemplary embodiment may be recorded in a computer-readable recording medium, such as a CD-ROM, and provided. It is also possible to store the program in an external server such as a cloud server, and utilize the program via a network.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
  a memory configured to store first printing information on already executed printing in association with a raster image drawn by rasterization of the first printing information, the first printing information being described in a page description language and related to drawing; and
  a processor configured to:
    when second printing information included in a printing instruction which instructs execution of printing is identical to the first printing information stored in the memory, control printing according to the printing instruction using the raster image drawn by rasterization of the first printing information,
    when a plurality of pieces of first printing information, each of which is the first printing information, are stored in the memory, narrow down the plurality of pieces of first printing information beforehand according to a predetermined criterion, and
    when the second printing information is identical to one of the plurality of pieces of first printing information which have been narrowed down, control printing according to the printing instruction using the raster image.

2. The information processing system according to claim 1, wherein the processor narrows down the plurality of pieces of first printing information according to attribute information included in the printing instruction.

3. The information processing system according to claim 2, wherein the memory is configured to store the raster image for a predetermined period of time.

4. The information processing system according to claim 3, wherein the memory is configured to store the raster image for a period of time determined according to a volume of the raster image.

5. The information processing system according to claim 1, wherein the memory is configured to store the raster image for a predetermined period of time.

6. The information processing system according to claim 5, wherein the memory is configured to store the raster image for a period of time determined according to a volume of the raster image.

7. An information processing apparatus comprising a processor configured to:
when first printing information included in a first printing instruction is identical to second printing information included in a second printing instruction issued after execution of first printing according to the first printing instruction, execute second printing according to the second printing instruction using a raster image drawn by rasterization of the first printing information when the first printing is executed, the first printing information being described in a page description language and related to drawing,
when a plurality of pieces of first printing information, each of which is the first printing information, are stored, narrow down the plurality of pieces of first printing information beforehand according to a predetermined criterion, and
when the second printing information is identical to one of the plurality of pieces of first printing information which have been narrowed down, control printing according to the printing instruction using the raster image.

8. A non-transitory computer readable medium storing a program causing a computer to execute a process, the process comprising:
storing, in a memory, first printing information on already executed printing in association with a raster image drawn by rasterization of the first printing information, the first printing information being described in a page description language and related to drawing;
when second printing information included in a printing instruction which instructs execution of printing is identical to the first printing information stored in the memory, control printing according to the printing instruction using the raster image drawn by rasterization of the first printing information,
when a plurality of pieces of first printing information, each of which is the first printing information, are stored in the memory, narrow down the plurality of pieces of first printing information beforehand according to a predetermined criterion, and
when the second printing information is identical to one of the plurality of pieces of first printing information which have been narrowed down, control printing according to the printing instruction using the raster image.

* * * * *